No. 761,804. PATENTED JUNE 7, 1904.
E. D. WILDERSPIN.
VEHICLE WHEEL.
APPLICATION FILED NOV. 27, 1903.
NO MODEL.

Witnesses
O. E. Murray.
M. A. Schmidt.

Inventor
Edward D. Wilderspin,
by Miles D. Stevens and Co.
Attorneys.

THE NORRIS PETERS CO., PHOTO-LITHO., WASHINGTON, D. C.

No. 761,804. Patented June 7, 1904.

UNITED STATES PATENT OFFICE.

EDWARD D. WILDERSPIN, OF DETROIT, MICHIGAN.

VEHICLE-WHEEL.

SPECIFICATION forming part of Letters Patent No. 761,804, dated June 7, 1904.

Application filed November 27, 1903. Serial No. 182,803. (No model.)

*To all whom it may concern:*

Be it known that I, EDWARD D. WILDERSPIN, a citizen of the United States, residing at Detroit, in the county of Wayne and State of Michigan, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicle-wheels, more particularly that kind having spiral springs instead of spokes extending from the hub to the rim.

The object of the invention is to provide a simple, strong, and durable wheel of this kind; and it consists in an arrangement and combination of parts hereinafter described and claimed.

Figure 1:
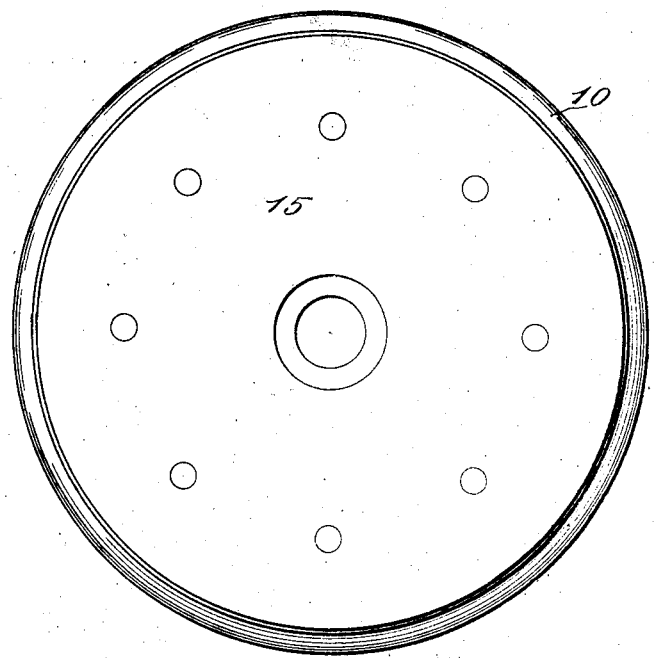
Figure 2:
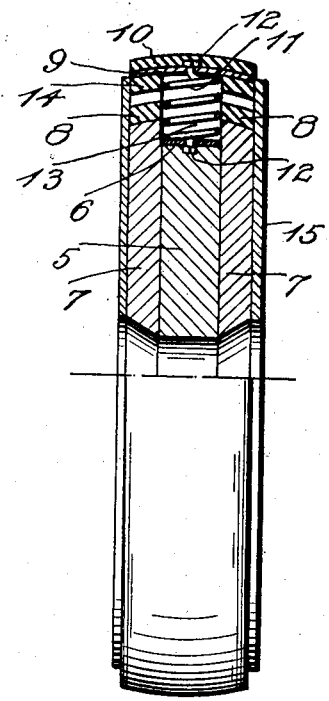
Figure 3:
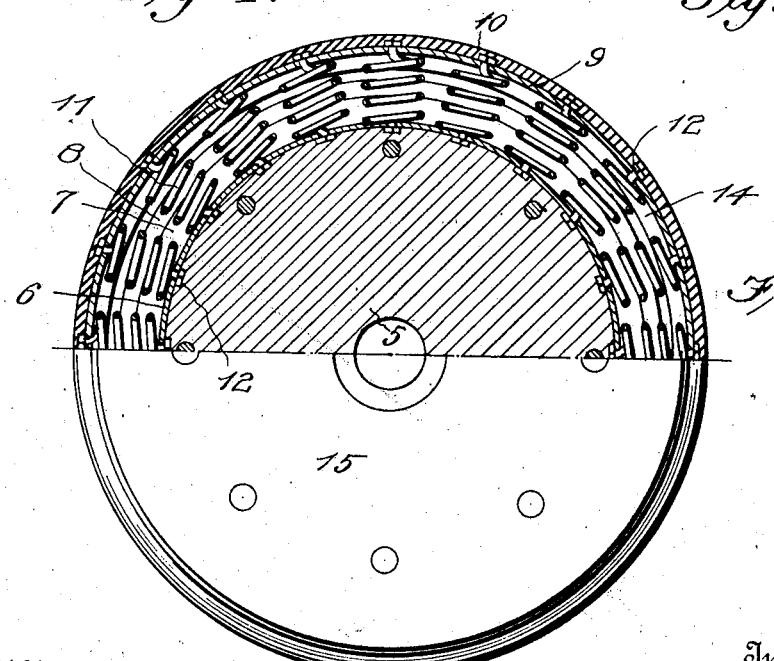

In the accompanying drawings, Figure 1 is a side elevation. Fig. 2 is an edge view, partly in section. Fig. 3 is a side elevation, also partly in section.

The hub of the wheel comprises three disks, which are preferably made of wood and are secured together in any suitable manner. The center disk 5 has secured to its face a metal band 6 to strengthen it, and the faces of the outer disks 7 are covered with a strip of rubber or other elastic material 8 for a purpose to be hereinafter described. The rim is indicated at 9 and is preferably made of metal and has a solid-rubber tire 10.

At 11 are indicated spiral springs, which extend between the hub and the rim. These springs have threaded ends, which extend through the rim and the band 6, respectively, being fastened thereto by nuts 12. The springs are of about the same width as the disk 5, and as the latter is smaller than the outer disks 7 a groove 13 is formed in which the springs set, which prevents lateral movement thereof.

A strip of rubber or other elastic material 14 extends around the under side of the rim opposite the disks 7. The rim and disks are therefore cushioned with respect to each other, which prevents jar and injury of the parts when the rim is forced inwardly too far and strikes the hub.

At 15 are indicated thin metal disks, which are secured to the outer ends of the disks 7 and extend up to the rim on both sides thereof, whereby the movement of the same is guided. The springs are also concealed by the disks 15, which adds to the appearance of the wheel.

I claim—

1. A wheel comprising a hub, and a rim, spiral springs therebetween, and cushions on the face of the hub and on the under side of the rim.

2. A wheel comprising a hub and a rim, spiral springs therebetween, cushions on the face of the hub and on the under side of the rim, and a disk over each end of the hub extending to the rim.

In testimony whereof I affix my signature in presence of two witnesses.

EDWARD D. WILDERSPIN.

Witnesses:
WILLIAM H. VOLK,
JESSIE A. GORDON.